J. D. ROOTS.
HINGE FOR DOORS, GATES, AND THE LIKE.
APPLICATION FILED FEB. 1, 1909.

963,069.

Patented July 5, 1910.

Witnesses,
C. A. Carlisle.
R. H. Bentley

Inventor,
James Dennis Roots

UNITED STATES PATENT OFFICE.

JAMES DENNIS ROOTS, OF WEST KENSINGTON, LONDON, ENGLAND.

HINGE FOR DOORS, GATES, AND THE LIKE.

963,069.  Specification of Letters Patent.  Patented July 5, 1910.

Application filed February 1, 1909. Serial No. 475,472.

*To all whom it may concern:*

Be it known that I, JAMES DENNIS ROOTS, a subject of the King of Great Britain, and a resident of 58 Avonmore road, West Kensington, London, W., England, have invented new and useful Improvements in Hinges for Doors, Gates, and the Like, of which the following is the specification.

This invention relates to a hinge constructed with a screw thread, and ball bearing, by which the frictional resistance of the hinge is very greatly reduced, and the door or gate to which the hinge is fitted is rendered self-closing.

The hinge spindle has cut upon it a helical groove or thread, the depth or hollow of which is in transverse section practically the half of a circle. The thread may be cut of any suitable or desired pitch. A similar thread is cut upon the inside of a sleeve or the like which forms the lug or butt of the hinge. The spindle is preferably slightly less in outside diameter than the inner diameter of the sleeve. The transverse section of the two helical grooves or threads when they register opposite each other, plus the clearance space between the spindle and the sleeve preferably forms a complete circle or approximately so. Balls are fitted in the threads so formed and almost fill the said circle, with just sufficient clearance for working. The balls therefore in this case correspond to the actual thread in any ordinary screw. The said helical or spiral grooves may be of V or other modified form. The threads may be hardened in the ordinary manner to resist wear.

Figure 1:
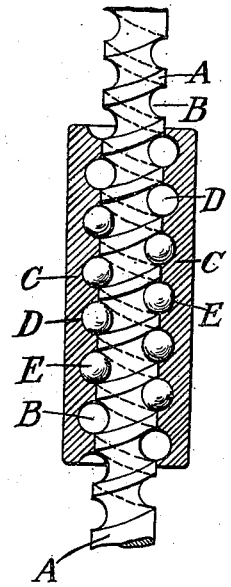
Figure 2:
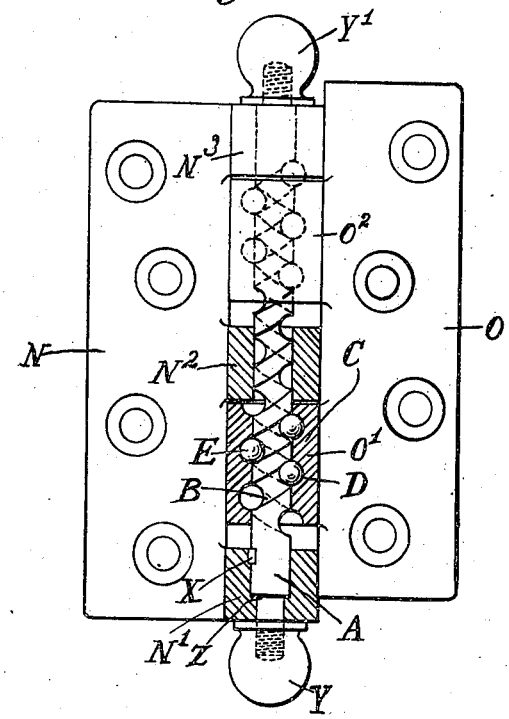
Figure 3:
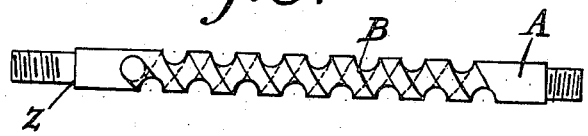

Figure 1, is a diagram in section to illustrate the invention and showing the spindle formed in one piece, with the hinge leaves removed. Fig. 2, shows an elevation of a door hinge. Fig. 3, shows the spindle of the hinge.

Referring to Fig. 1, A, is the spindle provided with a spiral or helical groove B on its outside or cylindrical surface. This helical groove is as shown semicircular in cross-section. C, is the sleeve or nut which is provided on its inside cylindrical surface or bore with a similar helical groove D of like circular cross-section, and of exactly the same pitch, as the spiral groove B. The spindle A is made slightly less in diameter than the bore of the sleeve, and is therefore a loose working fit within the sleeve or nut C. When the spindle is fitted within the sleeve, so that the helical grooves are opposite to or register with each other, the section of the two grooves together is a circle or approximately so. Within the said grooves are fitted balls E preferably of hardened steel of a suitable size. A sufficient number of balls is inserted to fill a certain length of the groove, so that the sleeve shall preferably be rather more than twice the length of the desired maximum movement of the spindle.

In Fig. 2, N is one of the hinge plates formed of any suitable metal. The hinge plate N, may for example be screwed to the door post and the hinge plate O to the door. The hinge pin or spindle A, Figs. 2 and 3, is provided with a shoulder Z which rests upon a corresponding ledge or shoulder formed within the lug $N^1$ of the hinge plate N and I may also provide a key X, to hold said spindle against rotation within the lug. The screw caps Y and $Y^1$ serve to secure the spindle in its position. The spindle passes through the other butts or lugs $N^2$ $N^3$ which are cast or formed integrally with the hinge plate N. The other hinge plate O is provided with the lugs $O^1$ $O^2$, which constitute the sleeves C C Fig. 1, within which are cut the helical grooves D. The balls are fitted in each lug approximately sufficient in number to fill one complete thread. When the door is opened, the hinge plate O of the hinges rises on the spindle A, also raising the door to a height corresponding to the pitch of the groove and the distance the door is opened, see position Fig. 2. When the door is released, the weight of the door causes the balls to roll down in their grooves, thus closing the door. By this construction, the door is rendered always self-closing. It will be observed that the balls always support the weight of the door, not only vertically, but also that due to the overhang of the door. This causes a pull on the upper hinge, and a thrust or inward pressure on the lower hinge. The balls fit in the same manner in these helical grooves half-way in the groove on the spindle and half-way in the groove on the sleeve. It will be observed that in each case, the spindle without the balls fitted would pass freely through the sleeve, but with the balls in place, the balls fit approximately half in the spindle and half in the sleeve, and roll in the grooves cut in the spindle and sleeve.

What I claim as my invention and desire to secure by Letters Patent is:—

1. A hinge comprising a spindle provided with a continuous external groove and terminating short of both ends, said ends being screw-threaded, hinge plates having lugs forming a sleeve, the lugs of one plate being provided with an internal groove forming a ball race with said groove in the spindle, balls in said race, anchoring means secured to said screw-threaded ends and a key engaging the spindle and bottom lug.

2. A hinge comprising a spindle provided with a continuous external groove lying centrally thereof, the greater portion of its length, and terminating short of both ends, said ends being of a reduced diameter and being screw-threaded, hinge plates having integral lugs coöperating to form a sleeve, the lugs of one plate being provided with an internal groove forming a ball race, balls in said race, anchoring means secured to said screw-threaded ends, the bottom lug being formed with a shoulder adapted to support the spindle and connected parts, and a key engaging the spindle and said bottom lug to hold said spindle against rotation.

JAMES DENNIS ROOTS.

Witnesses:
H. D. JAMESON,
F. L. RAND.